United States Patent [19]
Detiker

[11] 3,869,944
[45] Mar. 11, 1975

[54] OPEN CLAMP WITH MEANS FOR CLOSING THE BAND ENDS

[76] Inventor: Hans Detiker, 21, Oberdorfstrasse, Horgen, Switzerland

[22] Filed: Apr. 10, 1973

[21] Appl. No.: 349,696

[30] Foreign Application Priority Data
Apr. 11, 1972 Switzerland.......................... 5273/72
Aug. 9, 1972 Switzerland....................... 11743/72

[52] U.S. Cl.................................. 81/9.3, 24/20 CW
[51] Int. Cl.............................................. B65d 63/02
[58] Field of Search............ 81/9.3, 3 R; 145/50 A; 24/20 TT, 20 S, 20 CW, 20 R, 21, 81 CC

[56] References Cited
UNITED STATES PATENTS

| | | | |
|---|---|---|---|
| 819,289 | 5/1906 | Kootz et al. | 145/50 A |
| 1,705,895 | 3/1929 | Blair | 24/20 CW |
| 3,027,128 | 3/1962 | Liberty | 24/20 TT |
| 3,235,925 | 2/1966 | Gerhardt et al. | 24/20 CW |
| 3,293,709 | 12/1966 | Holton | 24/20 TT |
| 3,429,605 | 2/1969 | Soesbergrem | 24/20 TT |
| 3,510,918 | 5/1970 | Detiker | 24/20 CW |
| 3,523,337 | 8/1970 | Detiker | 24/20 CW |
| 3,733,654 | 5/1973 | Willianson | 24/20 TT |

FOREIGN PATENTS OR APPLICATIONS
766  0/1914  Great Britain..................... 145/50 A Primary Examiner—Al Lawrence Smith
Assistant Examiner—Roscoe V. Parker
Attorney, Agent, or Firm—Craig & Antonelli

[57] ABSTRACT

A clamp for clamping a hose onto a nipple by means of an open band adapted to locked, with means for the contraction of the ends of the band; to that end the band is provided with perforation apertures in the upper band end and with barbs in the lower band end which engage in the perforation apertures when the band is placed about the hose; perforation apertures are also provided in the lower band end while a slot is provided in the upper band end within the area of the second-mentioned perforation apertures; the boundary wall of the slot is thereby provided within the area of its surface pointing away from the upper band end with an upset portion extending upwardly, i.e., outwardly.

29 Claims, 4 Drawing Figures

OPEN CLAMP WITH MEANS FOR CLOSING THE BAND ENDS

The present invention relates to a clamp for clamping a hose onto a nipple by means of an open band adapted to be closed, whereby means are provided for the contraction of the ends of the band, with perforation apertures in the upper band end and barbs at the lower band end which engage in the perforation apertures when the band is placed about the hose, and whereby perforation apertures are provided in the lower band end and a slot is provided in the upper band end within the area of the second-mentioned perforation apertures, preferably including also at least one tensional spring element in the band.

A clamp is known in the art which includes as tensional spring element an elastically deformable U-shaped bulge or, for purposes of tightening the band, a plastically deformable U-shaped bulge which are located within the area between the perforation apertures of the upper band end and the slot. The means for contracting the band ends thereby consist of expander-pliers or expander-tongs whose pressure edges or jaws are preferably constructed somewhat hook-shaped. The application of the jaws of the expander tongs takes place, on the one hand, in a perforation aperture of the lower band end and on the other, at the surface of the boundary wall of the slot pointing away from the upper band end or also at the upper U-shaped bulge.

Such types of bulges, however, are not present in all clamps of the aforementioned type, or if present, are not always located at the point in question so that one is left in that case with the alternative to apply the tool for the contraction of the band ends at the upper surface of the boundary wall of the slot, pointing away from the upper band end. This, however, is difficult in view of the thickness of the band which is always insignificant. If the end of the slot comes to lie over a web between two perforation apertures of the lower band end, then the radial depth is too small for a safe application of the tool. On the other hand, if the end of the slot comes to lie over a perforation aperture of the lower band end, then the tool can penetrate into this perforation aperture and can impair in that way the aimed-at relative movement between the band ends.

For purposes of overcoming these disadvantages, a clamp of the aforementioned type is constructed according to the present invention in such a manner that the boundary wall of the slot is provided within the area of its surface pointing away from the upper band end with an upset portion directed upwardly. The gripping and seizure of any instrument for the contraction of the band end is considerably facilitated by this measure, and it is also assured thereby that the instrument, once attached, remains reliably in engagement.

The circumstance may arise that a special tool, such as, for example, expander-tongs or pliers are not available. The described measures of the present invention now enable to use also a most simple, even improvised auxiliary means for the contraction of the band ends. A further measure consists analogously in that the means for the contraction of the band ends is constructed as strip-shaped instrument whose working end is somewhat narrower than the perforation apertures of the lower band end. Screwdrivers or also simple sheet metal strips may be used as such instruments.

It is recommended according to the present invention to construct the strip-shaped instrument with a tongue corresponding to the width of the perforation apertures, on both sides of which are provided wings disposed perpendicularly to the strip axis. In this manner the depth of penetration of the tongue in a perforation aperture is limited and a damage of the hose is avoided.

According to a special embodiment of the present invention, the lower end of the band is provided with an upwardly bent tongue which is guided in the slot. It is achieved thereby that the surface of the hose is protected and that the band ends overlap reliably.

According to a special embodiment of this invention, the band has a flat configuration whereby a prestress existing in the installed condition of the clamp is produced only by elastic deformation of the hose. The new type of clamping device enables the use of the described, particularly inexpensive construction of the band.

According to a further embodiment of this invention, the band is provided with at least one elastically deformable U-shaped bulge. This type of construction takes into consideration that a clamping of the band by means of the tightening device does not permit intermediate steps of the prestress from perforation aperture to perforation aperture. This type of construction is advantageous when the hose material is not particularly elastic. However, it also serves for the compensation of diameter changes of the nipple conditioned, for example, by the action of heat.

According to a further special embodiment of the present invention, the band is provided with at least one contractible U-shaped bulge. With this type of construction, intermediate values of a desired prestress can be readily achieved by differing contractions of the bulge. The tightening tool actuated either manually or by means of a servo-force, for example, by compressed air, may also be combined with a force measuring device so that even with unavoidable differences of the diameter of the nipple, of the length of the band, of the elasticity of the hose, etc., always the same prestress of the clamp can be adduced reliably and rapidly in a simple manner also in case of mass production assembly.

According to another special embodiment of this invention, the contractible U-shaped bulge is provided with an indentation within the area of its crown or top. This measure enables a contraction without the danger that the top or crown bends outwardly forming a pointed tip which would reduce the elasticity of the top or crown. The indentation has preferably an eliptical shape extending in the circumferential direction of the band.

According to a further embodiment of this invention, the band is divided at least at one place, and each of the band ends is provided with a perforation aperture, which perforation apertures are caused to overlap in such a manner that they are aligned with each other, whereby a spring element connecting the band ends and having a ring-shaped center portion and two flat end portions is so extended through the aligned perforation apertures that the end portions extend on the outer surface of the hose in opposite directions and the band ends move toward one another during tightening of the clamp.

According to a special type of construction according to this invention, the center portion is provided with an indentation within the area of its top or crown. According to a further special type of construction of this invention, the center part accommodates an approximately cylindrical member made of elastic material. These measures produce a highly elastic band which can fully satisfy all occurring changes of the diameter of the nipple and permits also the use of a hose having a very low elasticity.

A simultaneous use of one or several contractible U-shaped bulges with one or several of the described elastic elements produces a clamp which finds particularly versatile use and which satisfies also the different requirements.

Accordingly, it is an object of the present invention to provide a clamp which avoids by simple means the aforementioned shortcomings and drawbacks encountered in the prior art.

Another object of the present invention resides in a clamp with means for contracting the band end thereof which effectively prevents damage to the hose lying underneath the band, yet assures a reliable and safe assembly and disassembly of the band.

A further object of the present invention resides in a clamp of the type described above which can be readily closed and opened, i.e., locked and unlocked, thereby assuring repeated reuse thereof without danger of damage to the band or clamp structure.

A further object of the present invention resides in a clamp and tool for closing the same which is simple in construction, yet permits a reliable application of the tool without danger of damage to any part of the assembly.

These and other objects, features and advantages of the present invention will become more apparent from the following description when taken in connection with the accompanying drawing which shows, for purposes of illustration only, two embodiments in accordance with the present invention, and wherein FIG. 1 is an axial view of an open clamp in accordance with the present invention, shown partially in cross section;

Figure 1:
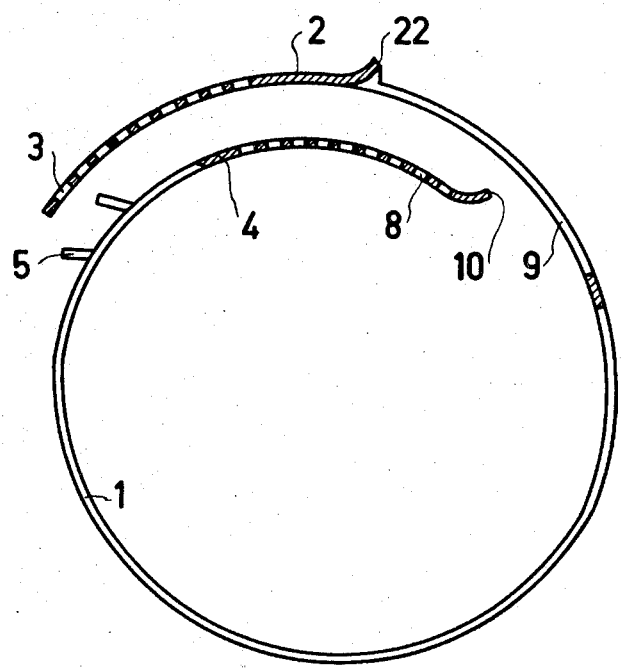

Referring now to the drawing wherein like reference numerals are used throughout the various views to designate like parts, and more particularly to FIG. 1, the band 1 illustrated in this figure includes an upper end 2 provided with the perforation apertures 3 as well as a lower end 4 having two barbs 5. When the band 1 is placed about the hose 6, the barbs 5 engage in two perforation apertures 3 of the upper end 2 of the band as can be seen readily from FIG. 2. The hose surrounds a nipple 7. The band 1 is provided at its lower end 4, on the side towards its end with respect to the barbs 5, with perforation apertures 8 of the same type as the perforation apertures 3, and is provided at its upper end 2, in a circumferential direction toward the center with respect to the perforation apertures 3 thereat, with a slot 9, whereby the band 1 is placed about the hose 6, at least one section of the perforation apertures 8 adjacent the lower end 4 are located within the area of the section of the slot 9 adjacent to the upper end 2 of the band 1.

The lower end 4 of the band 1 is provided with an upwardly bent tongue 10 which is guided in the slot 9.

The illustrated band 1 has a flat configuration. The prestress existing in the assembled condition of the clamp is produced only by the elastic deformation of the hose.

Figure 2:
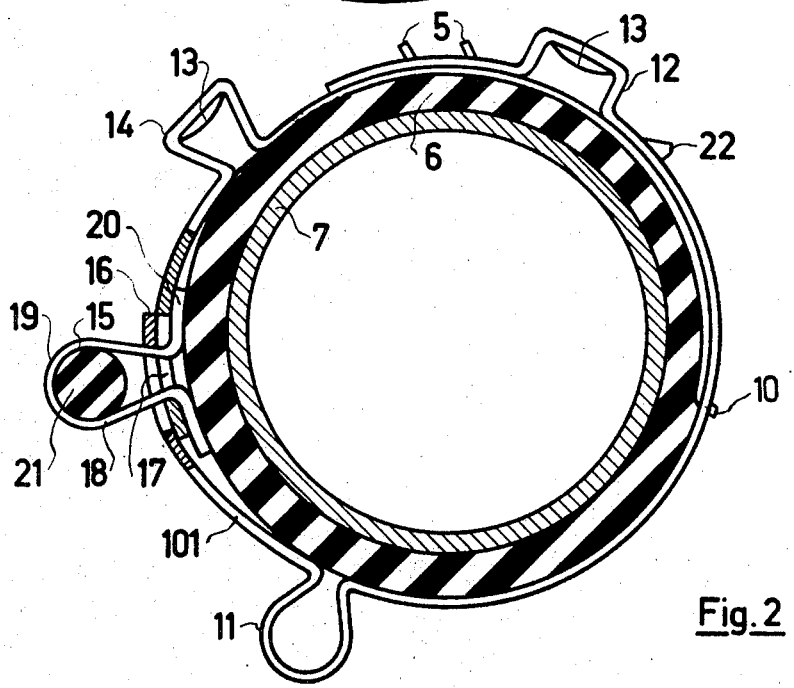
FIG. 2 is an axial cross sectional view through a modified embodiment of an installed clamp in accordance with the present invention.

The clamp with the band 101 illustrated in FIG. 2, includes the same parts as the band 1 in FIG. 1. The band 101 includes altogether four bulges 11, 12, 14 and 15 distributed over the circumference which, for the sake of clarity, are illustrated exaggeratedly large. The ear-shaped bulge 11 is elastically deformable. The ear-shaped bulge 12 is adapted to be tensioned or tightened and is illustrated in the untensioned condition. It is provided within the area of its top or crown with an indentation 13 which has an eliptical shape extending in circumferential direction of the band. The ear-shaped bulge 14 which is also adapted to be tightened is illustrated in the tightened or stressed condition. The band 101 is separated within the area of the bulge 15. Each of the band ends 16 is provided with a perforation aperture 17. These perforation apertures 17 are caused to overlap in such a manner that they are aligned with each other. A spring element 18 having a ring-shaped center portion 19 and two flat end portions 20, which connects the band elements, is so extended through the perforation apertures 17 that the end portions of the band extend on the outer surface of the hose 6 in mutually opposite directions and the band ends 16 move toward one another during the tightening of the clamp. The center portion 19 accommodates an approximately cylindrical member 21 of elastic material. The center portion 19 may be provided within the area of its crown and with an indentation, regardless of whether or not it accommodates the member 21.

The distribution of the bulges 11, 12, 14 and 15 over the circumference depends on the requirements in practice and in the illustrated arrangement is represented exclusively from the point of view of clarity.

Of course, any other known tensional spring elements may also be provided.

Figure 3:
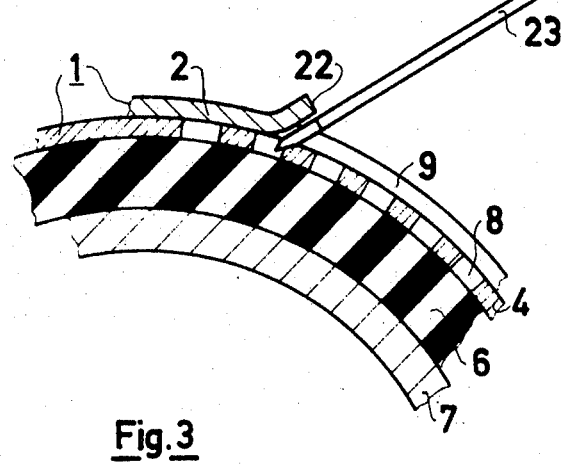
FIG. 3 is a partial cross sectional view of the clamp according to the present invention on an enlarged scale, with a means for contracting the band ends.

It can now be seen from FIGS. 1, 2 and 3 that the boundary wall of the slot 9 within the area of its surface pointing away from the upper band end 2 is provided with an upset portion 22 that extends outwardly, i.e., upwardly.

Figure 4:
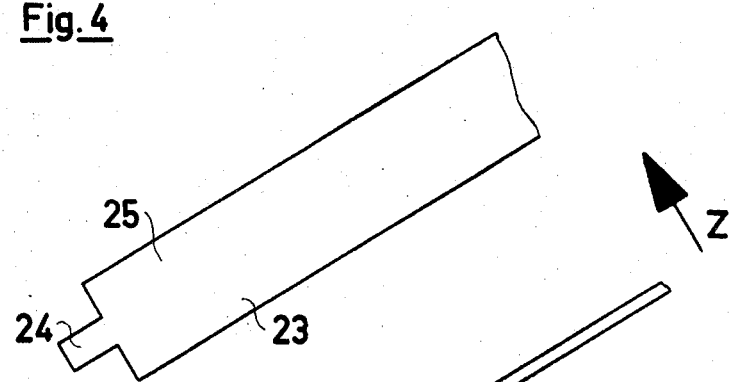
FIG. 4 is an elevational view of the means for contracting the band ends, taken in a direction at 90° to the view of FIG. 3.

A strip-shaped instrument 23 is illustrated in FIG. 3 by means of which the band ends 2 and 4 can be contracted. It can be seen from FIG. 4 that the working end 24 is constructed as tongue which is slightly narrower than the width of the perforation apertures 8 whereby wings 25 are provided on both sides of the tongue which extend perpendicularly to the strip axis, and which limit the depth of penetration of the working end 24 into the perforation apertures 8. By pivoting the end of the strip-shaped instrument 23 opposite the working end 24 in the direction of the arrow Z, the two surfaces of the upper band end 2 and of the lower band end 4, at which abuts the strip-shaped instrument 23, i.e., the upset portion 22 and the web between two perforation apertures 8 are displaced away from one another and the band is thus contracted, whereby the barbs 5 can be hooked into the perforation apertures 3 of the upper band end 2 or can be disengaged from the same, depending on whether tha clamp is to be installed or dismantled.

While I have shown and described only two embodiments in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A clamp for clamping a hose onto a nipple by means of an open band adapted to be closed, said band being provided with perforation apertures in the upper band end and with barbs in the lower band end which engage in the perforation apertures when the band is placed about the hose, further perforation apertures being also provided in the lower band end, and a slot being provided in the upper band end within the area of the further perforation apertures, characterized in that the boundary wall of said slot is provided with an upset portion within the area of its surface pointing away from the upper end of the band.

2. A clamp according to claim 1, characterized in that said upset portion extends generally radially outwardly.

3. A clamp according to claim 2, characterized in that at least one tensional spring means is provided in the band.

4. A clamp according to claim 3, further comprising tool means for contracting the ends of the band, said tool means being constructed as stripshaped instrument whose working end is slightly narrower than the width of the perforation apertures of the lower band end.

5. A clamp according to claim 4, characterized in that the strip-shaped instrument includes a tongue portion which is somewhat narrower than the width of the perforation apertures in the lower end of the band and wings on both sides of the tongue portion which extend perpendicularly to the strip axis.

6. A clamp according to claim 5, characterized in that the lower end of the band is provided with an upwardly bent tongue which is guided within the slot.

7. A clamp according to claim 6, characterized in that the band has a plain configuration whereby a prestress existing in the assembled condition of the clamp is produced only by elastic deformation of the hose.

8. A clamp according to claim 6, characterized in that the band includes at least one elastically deformable ear-shaped bulge means.

9. A clamp according to claim 6, characterized in that the band includes at least one contractible ear-shaped bulge means.

10. A clamp according to claim 9, characterized in that the contractible U-shaped bulge means is provided with an indentation within the area of its top.

11. A clamp according to claim 10, characterized in that the indentation has an eliptical form extending in the circumferential direction of the band.

12. A clamp according to claim 6, characterized in that the band is separated at least in one place, and in that each band end is provided with a perforation aperture means, said perforation aperture means overlapping one another in such manner that they are substantially aligned with each other, and a spring means connecting the band elements which includes a ring-shaped center portion and two flat end portions, said spring means being so inserted through the aligned perforation aperture means that the end portions extend on the outer surface of the hose in mutually opposite directions and the band ends move toward one another during the tightening of the clamp.

13. A clamp according to claim 12, characterized in that the center portion is provided with an indentation within the area of its top.

14. A clamp according to claim 13, characterized in that the center portion accommodates an at least approximately cylindrical member of elastic material.

15. A clamp according to claim 12, characterized in that the band includes at least one elastically deformable ear-shaped bulge means.

16. A clamp according to claim 15, characterized in that the band includes at least one contractible ear-shaped bulge means.

17. A clamp according to claim 16, characterized in that the contractible U-shaped bulge means is provided with an indentation within the area of its top.

18. A clamp according to claim 1, further comprising tool means for contracting the ends of the band, said tool means being constructed as strip-shaped instrument whose working end is slightly narrower than the width of the perforation apertures of the lower band end.

19. A clamp according to claim 18, characterized in that the strip-shaped instrument includes a tongue portion which is somewhat narrower than the width of the perforation apertures in the lower end of the band and wings on both sides of the tongue portion which extend perpendicularly to the strip axis.

20. A clamp according to claim 1, characterized in that the lower end of the band is provided with an upwardly bent tongue which is guided within the slot.

21. A clamp according to claim 1, characterized in that the band has a plain configuration whereby a prestress existing in the assembled condition of the clamp is produced only by elastic deformation of the hose.

22. A clamp according to claim 1, characterized in that the band includes at least one elastically deformable ear-shaped bulge means.

23. A clamp according to claim 1, characterized in that the band includes at least one contractible ear-shaped bulge means.

24. A clamp according to claim 23, characterized in that the contractible U-shaped bulge means is provided with an indentation within the area of its top.

25. A clamp according to claim 24, characterized in that the indentation has an eliptical form extending in the circumferential direction of the band.

26. A clamp according to claim 1, characterized in that the band is separated at least in one place, and in that each band end is provided with a perforation aperture means, said perforation aperture means overlapping one another in such a manner that they are substantially aligned with each other, and a spring means connecting the band elements which includes a ring-shaped center portion and two flat end portions, said spring means being so inserted through the aligned perforation aperture means that the end portions extend on the outer surface of the hose in mutually opposite directions and the band ends move toward one another during the tightening of the clamp.

27. A clamp according to claim 26, characterized in that the center portion is provided with an indentation within the area of its top.

28. A clamp according to claim 26, characterized in that the center portion accommodates an at least approximately cylindrical member of elastic material.

29. A clamp for clamping a hose onto a nipple by means of an open band adapted to be closed, said band being provided with perforation apertures in the outer band end and with barbs as well as with perforation apertures in the inner band end, the barbs being operable to engage in the perforation apertures of the outer band end when the band is placed about the hose, a slot being also provided in the outer band end for the guidance of the free inner band end, and a tool for contracting the ends of the band, characterized in that the boundary wall of the slot includes an outwardly directed upset portion within the area of its surface pointing away from the outer band end, and in that the tool has an axis and includes a tongue which is somewhat smaller than the width of the perforation apertures in the inner band end, and wings on both sides of the tongue which extend generally perpendicular to the tool axis in such a manner that during the tightening of the band, the tongue is operable to be slipped under the upset portion and is adapted to be supported by means of the wings on the lateral outer band surfaces delimiting the slot in order to establish a safe operative connection between the clamp and the tool and to avoid a damaging of the hose during the tightening of the clamp.

* * * * *